United States Patent [19]

Behrens

[11] Patent Number: 4,688,431
[45] Date of Patent: Aug. 25, 1987

[54] ANNULAR LINEAR INDUCTION FLOWMETER

[75] Inventor: Hugh C. Behrens, Angleton, Tex.
[73] Assignee: The Dow Chemical Company, Midland, Mich.
[21] Appl. No.: 743,442
[22] Filed: Jun. 11, 1985
[51] Int. Cl.$^4$ .............................................. G01F 1/58
[52] U.S. Cl. ................................................. 73/861.11
[58] Field of Search ........................ 73/861.11, 861.12; 417/50; 324/204, 240, 239

[56] References Cited

U.S. PATENT DOCUMENTS 3,138,022 6/1964 Mayer .............................. 73/861.11
3,539,913 11/1970 Prival .................................. 324/204

FOREIGN PATENT DOCUMENTS 1157500 5/1958 France .............................. 73/861.11

Primary Examiner—Herbert Goldstein
Attorney, Agent, or Firm—G. R. Baker

[57] ABSTRACT

A device for measuring molten metal flow within a conduit capable of use without external cooling employing principles of magnetic field and electrical current generation therefrom by employing a post manufactured oxidation stabilized thermally treated mica as the electrica insulation between the laminations of the elements of the fingered magnetic laminate and annularly wound coils within the fingered laminate assembly, comprised of a tube and a tube core positioned within the tube forming an annulus therebetween, at least a pair of fingered laminate assemblies having an even number of fingers positioned about the periphery of said tube, each of the spaces between the fingers containing coils annularly wound about the tube, alternating coils being connected to a power source to induce a current in the intermediate coil(s) when metal is flowing in the annulus, which current is proportionate to the metal flow and is measured.

2 Claims, 1 Drawing Figure

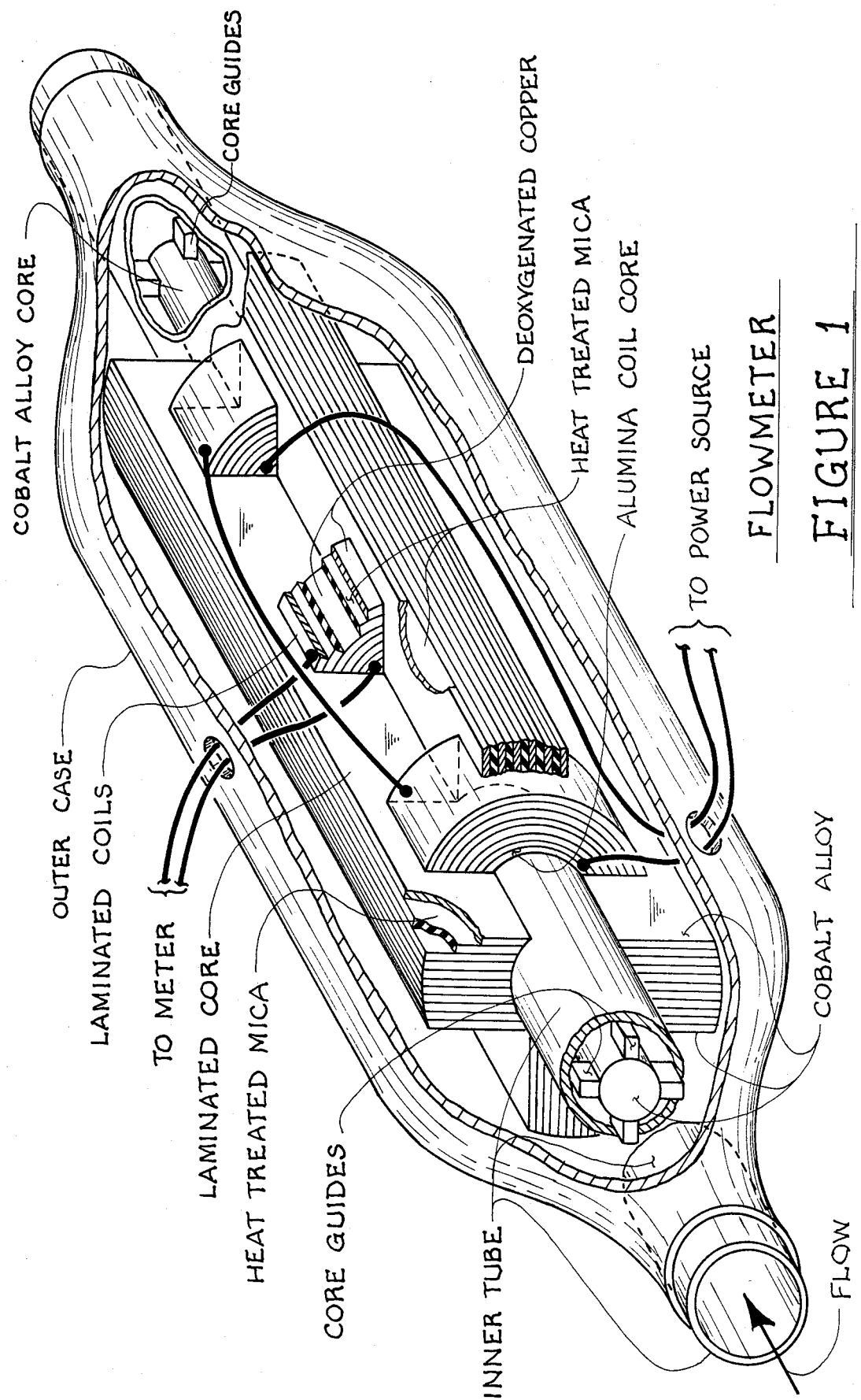

ANNULAR LINEAR INDUCTION FLOWMETER

CROSS REFERENCE TO RELATED APPLICATIONS

The invention described herein is related to my copending U.S. application Ser. No. 720,434, filed Apr. 5, 1985, entitled "Annular Linear Induction Pump with an Externally Supported Duct"; Ser. No. 741,782, filed Jun. 6, 1985, entitled "Molten Metal Handling System", now Pat. No. 4,635,706; Ser. No. 741,939, filed Jun. 6, 1985, entitled "Flat Linear Flowmeter"; and Ser. No. 743,343, filed Jun. 11, 1985, entitled "Molten Metal Shot Size and Delivery Mechanism For Continuous Casting Operations", now Pat. No. 4,633,930.

BRIEF DESCRIPTION OF THE INVENTION

The flowmeter of the present invention comprises a central tube, e.g. metal or ceramic, through which a molten metal will flow. Radially extending from the central tube are at least two and preferably more multi laminar multi-fingered magnetic metal core elements. Circumferentially wound about a non-magnetic tube, preferably a high purity, e.g. 98+%, which slides over the exterior of the central tube integral and within the fingers of said cores are an odd number of at least three copper coils. The odd numbered coils are connected in series but each coil is wired to carry current in to opposite direction to the other thus to establish a field between the pole ends of the core fingers. The intermediate even numbered coil or coils are wired to transmit an induced current to a meter. The core and windings are encased in a metal or ceramic housing sealed to the central tube at each end. The coil windings are each electrically insulated from the other, preferably, with a special grade of high temperature mica. Similarily the several laminae of each multi-fingered core are electrically insulated from each other and the inner coil ends and inner winding surfaces are likewise preferably electrically insulated from the central tube. A core rod is positioned within the central tube providing therewith an annulus through which molten metal can flow.

In operation of the flow meter of the present invention a single phase alternating current is impressed across the odd numbered series connected windings and creates a magnetic field internal of the central tube in the annulus. When metal flows through the annulus and thus across this field there is generated in the metal an induced current which induces a voltage in the intermediate winding(s) which can be measured. There is a direct relationship between the volume of metal flowing, the current generated and the induced voltage in the intermediate coil which latter correlates a measurement of the metal flowing through the annulus of the central tube of the apparatus.

The essential materials of construction and design are (1) insulation, preferably a specially treated mica which has been specifically freed of impurities, which were found to be released at high temperatures, e.g. about 1300° F. (ca 700° C.) hereafter more fully described; (2) windings of Invar and the like, but, preferably deoxygenated copper; (3) central tube, in contact with molten metal, a non magnetic material, e.g. when measuring magnesium it is preferably 347 stainless steel which is a columbiun stabilized nickel alloy, (4) a core rod, preferably of a cobalt steel alloy having a Curie point above the temperature of molten metal being measured.

It was discovered that conventional electrical grade mica, when subjected to the high temperatures encountered in pumping magnesium, released impurities of unknown indentification. Conventional mica sheets produced for electrical insulation and which have not been treated as hereinafter described released impurities beginning at temperatures above about 400° C., which impurities were found to be the primary cause of the shorting of the windings and/or laminated cores in commercial apparatus used for metal processing which had no external cooling. Therefore a special grade of mica is required.

It has now been found (as more fully described in my copending application Ser. No. 720,434, filed on Apr. 5, 1985, entitled "Annular Linear Induction Pump with Externally Supported Duct", which is incorporated herein in toto, that if conventional commercially available mica, for example in sheet form, the usual form of mica employed to insulate transformer laminations as well as electrical resistance applications, is heated to above 500° C. for from 1 to 24 hours and preferably above 850° C. under an oxidizing atmosphere, e.g. air, for a period in excess of eight hours, the so treated mica will withstand the rigors of high temperature (above 1300° F., (700° C.)) without producing a shorting condition. Conventional mica used as a laminate insulation and the coil winding insulation even when padded with argon when placed in magnesium service resulted in a black soot forming on the mica surface, whereas mica which had been treated in accordance with the present invention and similarly employed in an argon padded atmosphere showed no visible evidence of such sooty formation. In every instance where untreated mica was employed as the insulation in a pump used in magnesium service, shorting of the coils occurred in many instances on pre-use tests and/or shortly after immersion into the molten material.

With respect to the metal components of the fingered core, similar to the mica, temperature is a major consideration and if external cooling is not employed, and, preferably it is not, cobalt alloys are the metal of choice because the Curie point is not exceeded at operating temperatures in the range up to 1500° F.

DETAILED DESCRIPTION OF THE INVENTION

FIG. 1 represents in section an isometric elevation of a horizontally positioned flow meter of the present invention;

In accordance with the present invention a tube, in this instance, for handling magnesium, a 1¾" OD 347 stainless steel tube 10 inches in length (1), had three flat oxygenated copper annular windings (wound about a high purity alumina tube which slides snugly over the central tube) (2) located along its length held in place by four finger laminated core members (3). Each winding or coil (2) was wound with a mica strip, which had been treated as aforedescribed, between each layer of winding. Each core member also had a similarly treated mica strip between each lamination. The entire winding and core assembly was encased in a housing (4) sealed to the tube (1) at each end. A core rod (5) was inserted centrally within tube (1) providing with said tube interior surface an annular passage of about ¼ inch for metal to flow.

In this embodiment, to be operated at 60 HZ, the housing (4) for convenience was also 347 SS, although other metals or ceramics may be used, and the two or more laminated core members (3) and the core rod (5) were cobalt steel alloy. The housing was padded with argon gas.

In the four fingered cores represented in FIG. 1, the outside, 1st and 3rd, coils were connected in series to a power source so as to produce the appropriate polarities for the magnetic fields. The intermediate coil, coil 2, is connected to an ammeter thereby to measure the induced current generated when power is supplied to the outer coils and metal is flowed in the annular space between the core rod (5) and the wall of tube 1.

It is to be understood that the meter can be operated at power supply voltage frequency other than 60 hertz.

Calibration of the meter to metal flow was made by causing various amounts of metal to flow into a weighed container for a definite time period, the container reweighed and the readings taken from the ammeter correlated to such measured flows. The meter gave flow rates thereafter within ±2% of the actual metal flow. Other techniques known to those skilled in the art may of course be employed.

What is claimed is:

1. A device for measuring the flow of molten metal in a conduit which comprises
   a nonmagnetic metal conduit;
   at least two multi-fingered multi-lamina magnetic core elements about said conduit, said core having at least an even number of four or more fingers;
   coils of multiple turns of electrical conductive metal annularly wound about said conduit within the spacing between each of said fingers of said fingered core;
   each of said magnetic core elements and said windings insulated from electrical contact between laminations and turns, respectively, with a mica which has been post manufacture treated to at least 500° C. for from 1 to 24 hours in an oxygen containing atmosphere until no soot forms when the mica is heated to the treatment temperature under an argon atmosphere;
   means for connecting said odd numbered coils in series but in alternating reversal current passing sequence;
   a housing sealed to said conduit encompassing said coils and laminations within; a core rod positioned in said conduit so as to define a uniform annulus between said core rod and the inner surface of the conduit concentric to the conduit axis and said fingered core;
   means extending through said housing for connecting the even numbered coil(s) to an ampere measuring device;
   means extending through said housing to connect the odd numbered coils to a single phase alternating power source.

2. An electromagnetic flow meter for use in measuring the flow of molten metal having inducible electromagnetic properties which comprises a nonmagnetic tubular member having arranged about its external surfaces a series of cobalt alloy electromagnetic members each being comprised of a multiplicity of fingered laminates having an even number of four or more fingers, said laminates separated one from the other by a mica which has been post manufacture heated to above about 500° C. (932° F.) in the presence of an oxidizing gas for from 1 to 24 hours until substantially free of sooty formation visible when heated to 500° C. (932° F.) in an argon atmosphere and assembled into a single member, an electrical current carrying flat deoxygenated copper coil wound about said tubular member between each pair of fingers of said electromagnetic member in which each turn is likewise insulated with said mica, an exterior shell sealing with said tubular member said aforesaid members from the environment, said tubular member having a cobalt-alloy core located within and circumferentially aligned within said tubular member, a single phase electrical current carrying wire sealably extending through said shell in electrical contact with said copper coils, the odd numbered coils being wound in series and the even numbered coil(s) connected to a current measuring device.

* * * * *